United States Patent Office 3,660,548
Patented May 2, 1972

3,660,548
METHOD FOR CONTINUOUSLY PRODUCING FOAMED PANELS HAVING UNIFORM PROPERTIES
Hiroshi Komada, Akashi, and Kuniyasu Nakamura, Hyogo, Japan, assignors to The Toyo Rubber Industry Co., Ltd., Osaka, Japan
Continuation-in-part of abandoned application Ser. No. 408,006, Nov. 2, 1964. This application June 11, 1969, Ser. No. 832,393
Claims priority, application Japan, Nov. 6, 1963, 38/59,997
Int. Cl. B29d 27/04
U.S. Cl. 264—47                        5 Claims

ABSTRACT OF THE DISCLOSURE

A method for continuously producing foamed plastic panels having uniform properties by feeding a pair of sheets of flexible facing materials continuously downwardly into a space between two downwardly running conveying means through the upper end of the space, joining the side edges of the two sheets of facing material to form a tubular container, and running the conveying means to convey the foaming liquid material and the facing materials downwardly, whereby panels having flexible sheet material on both surfaces and a foam core are produced from the lowest end of the conveying means.

This application is a continuation-in-part of our application Ser. No. 408,006, filed Nov. 2, 1964 and now abandoned.

This invention relates to the method of manufacturing foamed plastic panels.

Conventionally, panel materials constructed with such synthetic resin foamed materials such as foamed polyurethane as a core material with flat sheets adhered on both surfaces thereof, have been widely used as construction materials.

Since foamed polyurethane etc. may be formed and cured even at a room temperature and pressure, the employment of a method of manufacturing by foaming-in-place is possible, and, besides, for joining of the foamed polyurethane and facing materials, no adhesive agent is required, because the foaming polyurethane itself has superior adhesive properties. Accordingly, methods of manufacturing panels by the foaming-in-place of polyurethane have been widely used.

These methods may be explained more concretely by classifying them broadly into two methods.

In one of these methods, the vertical foaming-in-place method, edging frames are fixed at the peripheral part of two vertically opposed facing materials, and, on the top of the frame, several pouring holes for pouring in the foamable polyurethane liquid are provided, through which said liquid is poured all at one time or in several increments. In the other method, the horizontal foaming-in-place method, edging frames are provided at the peripheral part of one horizontally placed facing material, and after pouring the foamable polyurethane liquid thereon, it is covered with the other facing material.

In both of these methods, the foaming pressure becomes quite high, and therefore, the panels should be placed under a restraining force as soon as foamable polyurethane liquid is poured. In case, moreover, the distance between the opposed facing materials is comparatively small, the density of foamed plastic will be high, and, at the same time, it will not be uniform, and thus, this method, because of the resulting quality and the cost involved, may not be said to be a desirable one. In view of this, the general method of manufacturing foamed plastic panel of small thickness is to cut the so-called slab-like foams, obtained by foaming polyurethane liquid in large molds, into the required dimensions, and to adhere them to the facing materials by adhesive agents.

However, this method has such defects as: (1) great losses of material by cutting are unavoidable, (2) a number of processes are required, and (3) special adhesive agents are required for satisfactory adhesion.

Recently, some horizontal and continuous so-called "laminator" method of manufacturing panels have been considered. These methods introduce foamable polyurethane liquid into a space between a pair of sheets which move in the horizontal direction. These methods, generally, have the following defects:

(a) It is difficult to distribute the said liquid uniformly.

(b) The self bonding strength to the two facing materials is not equal; that is, the processes by which said liquid contacts the two materials are different, and so the nature of the foam is not isotropic.

(c) The equipment therefor is extremely large.

As described above, this invention relates to an improvement in the method of manufacturing foamed plastic panels.

An object of this invention is to provide a method for manufacturing foamed plastic panels having uniform density and a light weight, by employing a vertical and continuous method characterized by cumulative foaming and two step expansion as explained hereinafter.

Another object of this invention is to provide a method for manufacturing easily and simply, foamed plastic panels of various thicknesses, having a uniform thickness, particularly foamed plastic panels having a small space between the facing materials thereof or a thin core material.

Still another object of this invention is to provide a method for manufacturing foamed plastic panels of desired length, with uniformity and high efficiency. Furthermore, it is also an object of this invention to be able to make the floor area required for the installation of such equipment very small.

In the conventional case, cumulative foaming is a method of foaming in continuous layers by intermittent pouring of the foamable polyurethane into a form having a large height in proportion to the cross-sectional area thereof, i.e. a vertical cavity. In this invention, the foamable polyurethane liquid having a relatively quick use time is poured continuously through the upper opening between opposed facing materials from a reciprocally moving nozzle in such small amounts, that while the previously poured foamable polyurethane liquid reacts and is partially set but has not completely expanded, the next foamable polyurethane liquid is poured onto the partly set foam, and thus the foam layers accumulate. Generally, if the liquid is poured all at one time to the stipulated height in a vertical cavity, the foaming pressure becomes large, especially in the lower part thereof, so there is a lack of uniformity in the properties of the foam, such as in the specific density and strength, between the upper and lower parts thereof. The foaming pressure is approximately proportional to the height, and, besides, it it generated at a specific period in the process of foaming. In view of this, use of the above-mentioned cumulative foaming method makes it possible to have only an extremely small foaming pressure generated continuously, with the result that the quality is made more uniform and it has the advantage that it is suitable for continuous production.

The foregoing and many other objects of our invention will become apparent from the following description and drawing, in which.

Figure 1:
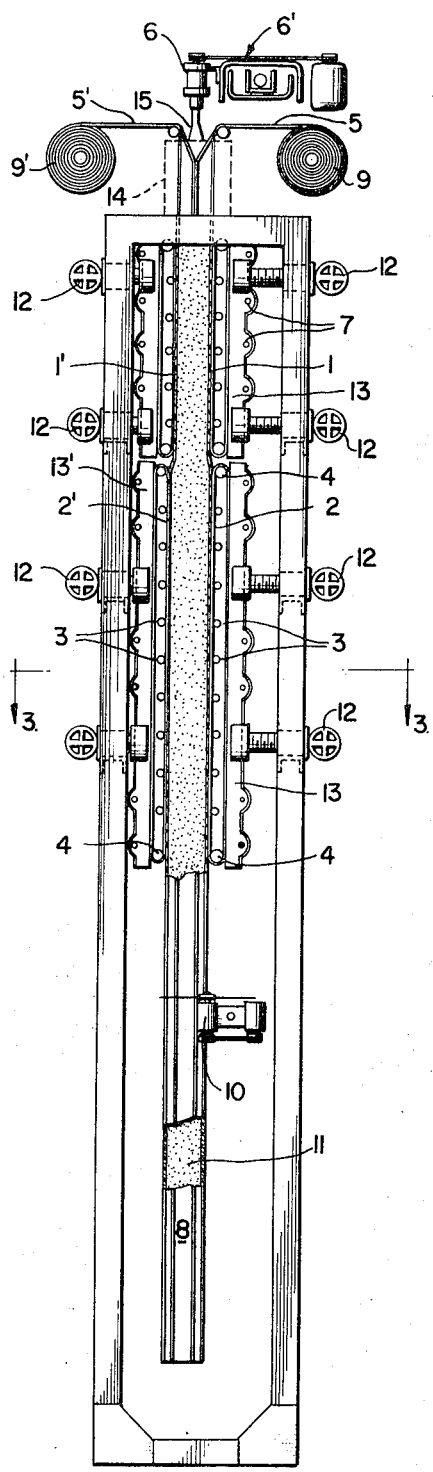
FIG. 1 is a side view showing an example of the equipment for executing the method of manufacturing foamed plastic panels of this invention.
Figure 2:
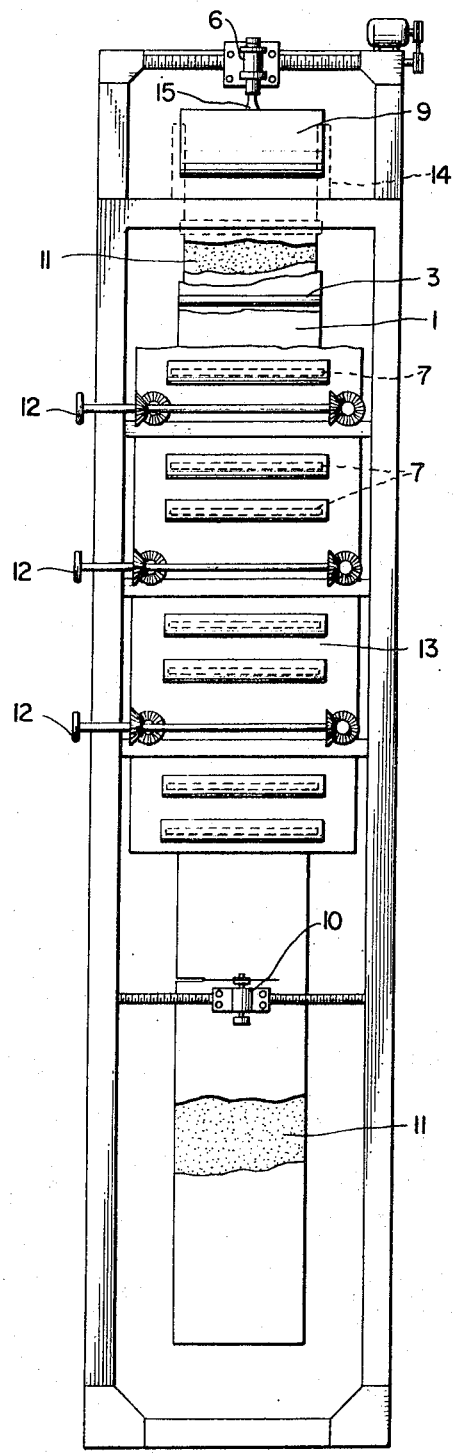
FIG. 2 is a front view of the same.
Figure 3:
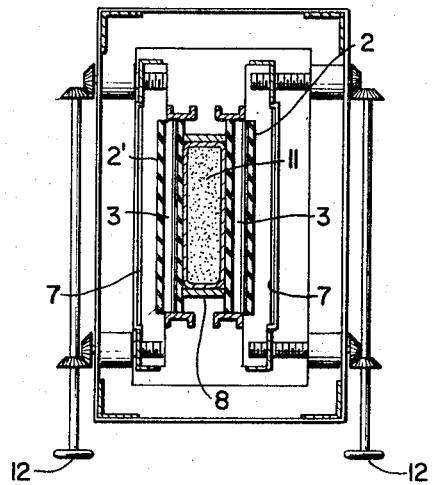
FIG. 3 is a partial sectional view on the line A—A of FIG. 1.

Describing the invention in reference to FIG. 1, 1 and 1', and 2 and 2' are two opposed pairs of conveyor belts, positioned vertically with one pair positioned above the other.

The space between these conveyor belts can be adjusted to approximately the thickness of the foamed plastic panel required, by revolving the handles 12, and moving back and forth the frames 13 on which the conveyor belts are fixed, by means of a gear transmission device.

Also, the space between the lower conveyor belts 2 and 2' should preferably be adjusted so that it is larger than that between the upper belts 1 and 1' by 10–20% and so that it is the same as the thickness of the panel required.

This is for the purpose of relieving the slight additional foaming pressure generated in the latter period in the zone of conveyors 2 and 2' after initial foaming in the zone of conveyor belts 1 and 1' so that there is produced a light-weight foamed plastic panel having uniform characteristics.

The length of the conveyor belts should be determined depending on the travelling speed thereof, the time of completion of foaming or "the rise time" of the foamable polyurethane liquid and other factors. Generally, however, a total length thereof of 2000–3000 mm. is considered to be appropriate.

These conveyor belts are driven by the rollers 4 connected to a variable speed motor (not shown). The rollers 3 provided on the inside surface of the conveyor belts 1 and 1', 2 and 2' are the thickness controlling rolls for controlling the thickness of the foamed plastic panel accurately, and moreover, finishing the surface thereof so that it is flat and smooth.

Flexible facing materials 5 and 5' are positioned opposite to each other, and are so mounted that they may be unrolled from the supply rolls 9 and 9'. A seaming apparatus 14 is positioned on each side of the entrance to the space between the upper conveyor belts, which join the side edges of the facing materials 5 and 5' to form a tube to contain the foamable polyurethane liquid poured into the space between the materials 5 and 5'.

The seaming methods used in the seaming apparatus can be such general well-known methods as sewing with thread, adhering by pressure-sensitive adhesive, overlapping and crimping, folding, inserting a resilient spacer, etc. In this invention, as the foamable polyurethane liquid will gelatinize in a short time, and it will have little flowability, the purpose of the liquid seal can be attained by a comparatively easy method. As both side edges thereof are to be cut off eventually, the form of seal is not too important.

A mixing head 6 is provided above the conveyor belts 1 and 1' and which discharges the foamable polyurethane liquid into the space between the pair of opposed conveyor belts 1 and 1', and the mixing head is moved by means of 6', shown schematically as relatively slideable members, and a screw traverser, with a reciprocal motion along the upper opening of the space at a fixed speed with a stroke slightly smaller than the width of the space formed by the facing materials. Heating devices 7 are placed on the back side of the conveyor belts for accelerating the completion of the foaming, and are securely mounted on the frames 13 and 13'. For heating, infrared ray heating and electric heating, etc. are used. A pair of pressing plates 8 are provided on the opposite side edges of the panel for defining said edges. A cutter unit 10 is provided which comprises a disk-saw revolving horizontally and a screw threaded traverser which makes the cutter carry out a reciprocable movement horizontally and in the direction of the width of the product, and this unit is installed on vertical guide rods so that the whole unit can move vertically. This unit starts when the desired length of the product has passed the saw, and cuts the product into the desired length while moving downwardly along the vertical guide rods with the movement of the panel. The panel 11 of foamed plastic is thus cut from the continuously formed material. The belt conveyors may be replaced by roller conveyors and driving part or all of the controlling rollers 3. In this case, it is desirable that the controlling rollers are arranged close together.

While the belt conveyor system is suitable especially to make the surface of the product flat and smooth, the roller conveyor system is better for heating from outside.

In manufacturing foamed plastic panels by such a method as described above, the facing materials 5 and 5' guided from the supply rolls 9 and 9' have the edges joined together by the seaming apparatus 14, both side edges being seamed together to produce a tubular container and the facing materials are introduced to conveyor belts 1 and 1'. The space between the sheets is initially blocked by seaming the end edges of the facing materials. If desired a slug of foamed material can be inserted in the closed end of the tubular container. The rollers 4 are driven, and then the belts are operated, or in case of roller conveyors, the controlling rolls 3 are driven and the facing materials are made to move downwardly and at the same time the mixing head is moved reciprocally to the left and right, and while doing this, the foamable polyurethane liquid 15 is discharged into the tubular container formed of the facing materials. At the start of this operation, it is convenient for guiding the facing materials downwardly into the conveyor and to form a plug for preventing free fall of the foamable polyurethane liquid through the space between the belts to insert a block of foamed plastic which is a square having a size equal to the width of the product and a thickness equal to or a little larger than the space between the lower conveyor belts 2 and 2'. As the facing materials 5 and 5' move down continuously while being formed into the tubular container, the foamable polyurethane liquid is gradually accumulated and foamed in the inside thereof.

Here it is very important to determine the amount of the foamable polyurethane liquid discharging from the mixing head into the tubular container made of the facing materials, in order to make it possible to carry out cumulative foaming satisfactorily. Namely, it is necessary to make the depth that the discharged foamable polyurethane liquid penetrates into the lower strata in the process of foaming, as small as possible. This is for the reason that, if the newly discharged resin liquid material penetrates too deep, foam quality might be damaged since the foamable polyurethane liquid thus mixed will be foaming after having started at different times. In order to thoroughly carry out cumulative foaming, it is vitally important to minimize as far as possible the cumulative thickness of the layer of foamable polyurethane liquid. It is difficult to express directly the thickness which is penetrated, but as a consequence of experiments, it has become possible to express it indirectly as a cumulative coefficient, that is, when the other factors, i.e. the formulation of the liquid, temperature, etc. are constant, this thickness corresponds to a value made up of the time taken until the foamable polyurethane liquid completes foaming, or "the rise time," the amount of discharge or the weight of the liquid charged into the tubular container in a fixed period of time, and the sectional area of the product.

If the operation is carried out under conditions such that the cumulative coefficient is less than the proper value, undesirable dents or hollow lines will appear on the surface of the finished foamed article which indicate imperfect cumulation. On the contrary, if the value is too great, some cracks will be observed in the inside of the foamed article which indicate considerable shear movements caused by the deep penetration.

Accordingly, it is found that appropriate establishment of the mutual relations between these values is required for satisfactory cumulative foaming. (A practical explanation thereof will be provided in connection with a specific embodiment.)

The substance which has finished initial foaming in the zone of the upper conveyor belts 1 and 1' usually expands further slightly, and accordingly, said substance passing between the upper conveyor belts 1 and 1' is conveyed to the lower conveyor belts which have been spaced a distance 10–20% larger than the spacing between the upper conveyor belts. The foaming pressure generated during the latter foaming is relieved in the direction of the thickness, and consequently the light weight foamed plastic panel is obtained.

In the vertical method, the foaming pressure rises at a certain period during the foaming process in the mold. At that time, if the mold walls are shifted slightly to allow the foam to expand further, there are observed many effective results, such as the decrease of pressure and density, the increase of uniformity of foam properties and so on. To obtain this result in the continuous foaming, it is necessary to find the proper time and amount said mold walls should be shifted.

According to research conducted by the present inventors, it has been found that there exists the following relationship between the time during which the foaming substance passes between the belts 1 and 1' of the first stage, and the dimension of the space between the lower conveyors 2 and 2' which is larger than the space between the upper conveyors 1 and 1'. Namely:

(1) In case the space is made larger by 10%, the time required to pass between the upper conveyors 1 and 1' should be about ½ of the rise time, and in case it is made larger by 20%, the time should be about ⅓ of the rise time.

(2) Depending on the formulation of the foamable polyurethane liquid and the method of pouring, an appropriate range of 10–20% should be selected.

(3) The product of the time required to pass through the upper conveyors and the speed of the conveyors represents the desirable height of foaming in the space between the upper conveyors or the desirable level of the top of the foam.

By taking into consideration the above factors, the length of the belts in the first stage may be determined.

Foamed plastic panel coming out of the space between the lower conveyor belts is cut into the stipulated size by the cutter to form the completed product.

According to the method of this invention, the foam layer may be formed and accumulated by selecting a polyurethane formulation so prepared that foaming may be finished in a relatively short time, and moreover, by appropriately adjusting the amount thereof to be poured and the feeding speed of the face materials, the foaming pressure can be drastically reduced. Accordingly, a compressing frame work withstanding the strong pressure accompanying foaming, as conventionally required, is not necessary, and by the use of simple rollers, as seen in the figures, uniform foamed plastic panels having a sufficiently uniform thickness and a low density are obtained.

As the facing material, flexible sheets such as various kinds of paper, aluminum foil, polyvinyl chloride, polystyrol resin or other synthetic resin films which may be reeled in a roll, are suitable.

The following embodiment will further illustrate the nature of this invention, but the invention is not restricted to this embodiment.

EMBODIMENT

A panel having a 25 mm. thickness, and 1000 mm. width is manufactured.

PREPARATION OF FOAMABLE POLYURETHANE LIQUID

While agitating in a reaction vessel filled with nitrogen gas, 363 parts by weight of tolylene diisocyanate (an 80:20 mixture of 2.4/2.6 isomer), the mixture is heated to 60–70° C. and 100 parts by weight of polyether is added slowly. Then the reaction temperature is maintained at 90° C. and by holding the temperature for an hour the reaction is carried out. After reaction it is rapidly cooled to room temperature. The prepolymer thus obtained has a free NCO content of 30.1% and viscosity of 1300±100 cps.

The prepolymer thus obtained is made into foamable polyurethane liquid by the following formulation:

| Formulation: | Parts in weight |
|---|---|
| Polyether (sorbitol series OH value 500) | 100.0 |
| Dibutyl tin dilaurate | 0.5 |
| Triethylenediamine | 1.0 |
| Silicone oil (L–520, manufactured by U.C.C.) | 0.5 |
| Blowing agent (trichloromonofluoromethane) | 40.0 |
| Prepolymer | 130.0 |

The time for completion of foaming, or the rise of this formulation is about 40 seconds.

MANUFACTURE OF FOAMED PLASTIC PANELS

First the spaces between the conveyor belts 1 and 1' and 2 and 2' are set at 25 mm.

As the facing material, kraft paper is used, both the end edges and the side edges thereof being seamed together by the seaming apparatus provided on each side of the opening of the space between the upper conveyors 1 and 1' so that both side edges are successively seamed at the same rate as the advance of the facing materials. Consequently, the width of kraft paper, the facing material, is required to be larger than that of the desired foamed plastic panel in order to provide for the thickness of the panel and a margin for seaming. In the present embodiment, a width of 1080 mm. is used.

The width of the conveyor belts, on the other hand, is slightly larger than that of the foamed plastic panel or 1050 mm., the length thereof is 500 mm. for the upper part and 2000 mm. for the lower part. The surface speed of the conveyor belts is set at about 1000 mm./min., and the mixing-pouring nozzle 6 is so adjusted that it will carry out a reciprocating movement along the upper opening of the space between the upper conveyor belts at a speed of 20 m./min. and with a stroke of 950 mm. The edge pressing plates 8 are spaced a distance of 1020 mm.

Here, in order that cumulative foaming may be carried out satisfactorily, the amount of foaming polyurethane liquid discharged is calculated by the following formula.

The cumulative coefficient (F) for successfully carrying out cumulative foaming may be represented as follows, provided that the other factors are defined:

$$F = \frac{T \times W}{A}$$

where:

T = Rise time in seconds of the foamable polyurethane liquid;
W = Discharged amount in grams/min.; and
A = Sectional area in square centimeters of the discharging cavity.

Here, a satisfactory result may be obtained in the range of F=50–200, and therefore, the values are set as follows:

F = 200
T = 40 sec.
A = 250 cm.$^2$ then:

W = 1250 g./min.

Namely, in the present embodiment, an amount of 1250 g./min. is known to be appropriate for cumulative foaming.

First, the side edges of the facing materials are seamed to produce a tubular container and then the space between the facing materials is initially blocked by seaming the end edges and insertion of a foam slug 1000 x 1000 x 25 mm. therein. The conveyors 1 and 1' are driven for a moment, and the facing materials are introduced into the space therebetween so that said slug will be conveyed to the lower conveyors 2 and 2'. Then, the dimension of the space between the upper conveyor belts 1 and 1' is reduced to 22 mm. The mixing head 6 is driven and the continuous pouring of the foamable polyurethane liquid, manufactured by the above-described method, is carried out at the rate of 1250 grams/min., at the same time, the conveyor belts are driven. At the start of operation, the facing materials will be guided downward by the foam slug inserted in the tubular container, and as curing progresses, they are pulled by the force of the foaming pressure forcing the facing material against the belts, and thus are continuously fed.

The foamable polyurethane liquid commences foaming in a few seconds after being poured and is gradually sent downward where it is foamed and accumulated.

The poured foamable polyurethane liquid is conveyed, while foaming, to the space between the lower belts in about 20 seconds or ½ of the rise time. Accordingly, the height of foaming substance between the upper belts may preferably be maintained at about 300 mm. for satisfactory foaming between the lower belts. This height can be easily adjusted by controlling the conveyor speed.

After passing the conveyor belts, the foamed plastic panel is obtained from the lowest end of the conveyor. This is cut into appropriate lengths of 1500 mm. and finished by trimming the side edges so that the panel has a width of 1000 mm.

Since the distance between the lower conveyor belts is set so as to be about 10% greater than that between the upper belts, the method of manufacturing foamed plastic panels according to this invention, as described above, is a vertical continuous method and has the following effects:

(1) In the conventional horizontal manufacturing method, it was difficult to spread the foamable polyurethane liquid uniformly on the facing material. However, in the method of this invention, which is a vertical method, and therefore the foaming strata are accumulated, the control of pouring is greatly facilitated, and besides, a uniform state of foaming may be expected. Moreover, the thickness may be changed easily.

(2) As a cumulative foaming method is adopted, panels may be produced with perfect uniformity of properties, and production efficiency can be drastically improved, and cutting loss is kept to a minimum.

(3) As a cumulative method is adopted, the foaming pressure is minimized, and at the same time, foamable polyurethane liquid having quicker foaming can be used, and the manufacturing equipment can be made compact, not necessitating any large mechanical strength and making it possible to reduce the floor space required.

(4) Because the space between the lower conveyors belts is made slightly larger, it will be possible to avoid unnecessary increase of the foam density due to the foaming pressure generated, while no disturbances in the cells of the foam or voids will be produced, and consequently, a product having little distortion and large strength can be obtained.

What is claimed is:

1. A method of continuously producing foamed plastic panels having uniform properties, comprising the steps of providing two pairs of spaced opposed vertically positioned conveyor means, an upper pair spaced from each other at a first distance and a lower pair spaced from each other at a 10-20% greater distance than the upper pair, the lower pair being immediately below the upper pair and aligned therewith, feeding a pair of sheets of flexible facing material continuously downwardly into the space between the upper conveyors through the upper opening of the space, joining the side edges of the two sheets of facing material to form a tubular container, initially blocking the space between the sheets, feeding a foamable polyurethane resinous liquid into the space under conditions such that the cumulative coefficient F is maintained at a value of from 50 to 200 and being according to the formula:

$$F = \frac{T \times W}{A}$$

wherein
T is the rise time of the foamable polyurethane resinous liquid, in seconds,
W is the amount fed, in grams/minute, and
A is the sectional area of the space between the sheets in square centimeters, controlling the speed of the conveyor means for maintaining the top of the poured foaming polyurethane resinous liquid at a level so that the period of time that the foaming polyurethane resinous liquid remains in the space between the upper pair of conveyor means is from ½ to ⅓ the rise time of the foamable polyurethane resinous liquid, and conveying the foaming polyurethanes resinous liquid to the larger space between the lower pair of conveyor means to enable relieving of the foaming pressure in the direction of the thickness of the panel and completion of the foaming, and running the conveying means to convey the foaming polyurethane resinous liquid and the facing materials downwardly, whereby panels having flexible sheet material on both surfaces and a foam core are produced from the lower end of the lower conveying means.

2. The method of claim 1 wherein the flexible facing material is paper.

3. The method of claim 1 wherein the flexible facing material is a polyvinyl chloride film.

4. The method of claim 1 wherein the flexible facing material is a polystyrol resin film.

5. The method of claim 1 wherein the flexible facing material is an aluminum foil.

References Cited

UNITED STATES PATENTS

| 2,956,310 | 10/1960 | Roop et al. | 264—54 |
| 3,037,897 | 6/1962 | Pelley | 264—47 X |
| 3,257,484 | 6/1966 | Barnette | 264—47 X |
| 3,262,827 | 7/1966 | Kallander et al. | 264—47 X |

FOREIGN PATENTS

| 548,684 | 9/1956 | Italy | 264—47 |
| 842,267 | 9/1952 | Germany | 264—47 |

OTHER REFERENCES

Knox, R. E. and R. A. Stengard: "Molding Rigid Urethane Foam." Bulletin: New information about Urethane Foam made with Du Pont "Hylene." E. I. du Pont de Nemours & Co (Inc.). Elastomer Chemicals Dept., Oct. 28, 1960, pp. 1–12.

Rubber and Plastics Age. Cellular Polymers: "Foamed Cored Panels for Transport," vol. 44, No. 5, May 1963, pp. 499 and 500.

PHILIP E. ANDERSON, Primary Examiner

U.S. Cl. X.R.

161—161, 190; 260—2.5 AS, 2.5 BD; 264—54, 55, 172